United States Patent [19]

Vaillant de Guelis et al.

[11] Patent Number: 4,918,345

[45] Date of Patent: Apr. 17, 1990

[54] MAGNETIC BEARING FOR ACTIVE CENTERING OF A BODY MOVABLE RELATIVE TO A STATIC BODY WITH RESPECT TO AT LEAST ONE AXIS

[75] Inventors: Hubert Vaillant de Guelis, Aubergenville; Jean-Pierre Roland, Vienne en Arthie; Patrice Jamain, Maule, all of France

[73] Assignee: Aerospatiale Societe Nationale Industrielle, Paris, France

[21] Appl. No.: 167,685

[22] Filed: Mar. 14, 1988

[30] Foreign Application Priority Data

Mar. 13, 1987 [FR] France .............................. 87 03489

[51] Int. Cl.$^4$ .............................................. F16C 39/06
[52] U.S. Cl. ................................ 310/90.5; 104/281; 324/207.16
[58] Field of Search ............... 310/90.5; 104/281, 283; 324/208

[56] References Cited

U.S. PATENT DOCUMENTS

| | | | |
|---|---|---|---|
| 3,741,613 | 6/1973 | Pfaler | 310/90.5 |
| 3,877,761 | 4/1975 | Boden | 310/90.5 |
| 3,955,858 | 5/1976 | Poubeau | |
| 3,976,339 | 8/1976 | Sabnis | |
| 4,000,929 | 1/1977 | Studer | 310/90.5 |
| 4,043,614 | 8/1977 | Lyman | 310/90.5 |
| 4,077,678 | 3/1978 | Studer | 310/90.5 |
| 4,285,553 | 8/1981 | Robinson | 310/90.5 |
| 4,294,493 | 10/1981 | Sindlinger | 310/90.5 |
| 4,470,644 | 9/1984 | Weisser | 310/90.5 |
| 4,652,780 | 3/1986 | Murakami et al. | |

FOREIGN PATENT DOCUMENTS

| | | |
|---|---|---|
| 0191225 | 1/1985 | European Pat. Off. |
| 2139506 | 2/1973 | Fed. Rep. of Germany ..... 310/90.5 |
| 2741062 | 3/1979 | Fed. Rep. of Germany ..... 310/90.5 |
| 2257815 | 1/1975 | France |
| 2524090 | 9/1983 | France |
| 836800 | 6/1960 | United Kingdom |

OTHER PUBLICATIONS

"Patent Abstracts of Japan", vol. 7, No. 215, (M-244) [1360], Sep. 22, 1983.

Primary Examiner—R. Skudy
Attorney, Agent, or Firm—Browdy and Neimark

[57] ABSTRACT

A magnetic bearing secures active magnetic centering with respect to at least one centering axis of a body movable relative to another a static body. It comprises, on each side of a plane of symmetry perpendicular to the centering axis and containing a reference axis: at least one permanent magnet magnetized parallel to the reference axis, at least one combination comprising a coil wound on a ferromagnetic core disposed to procure a magnetic flux parallel to the reference axis and ferromagnetic members adapted to provide a closed magnetic path for magnetic flux produced by the magnet and the coil via airgaps on the centering axis separating the movable body from the body body. A control circuit comprises a sensor responsive to relative movement between the movable body and the body body along the centering axis and adapted to feed to the coil a current adapted to correct any such relative movement. Two ferromagnetic plates carried by the body body have the magnet and the core clamped between them. A ferromagnetic polepiece carried by the movable body provides a closed magnetic path via the previously mentioned airgaps for the magnetic flux circulating in these ferromagnetic plates.

12 Claims, 4 Drawing Sheets

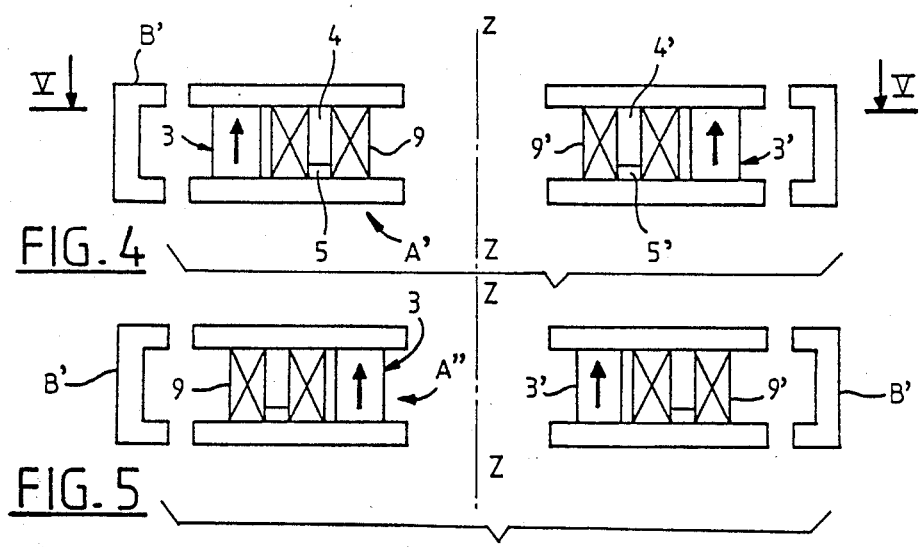
FIG.4
FIG.5
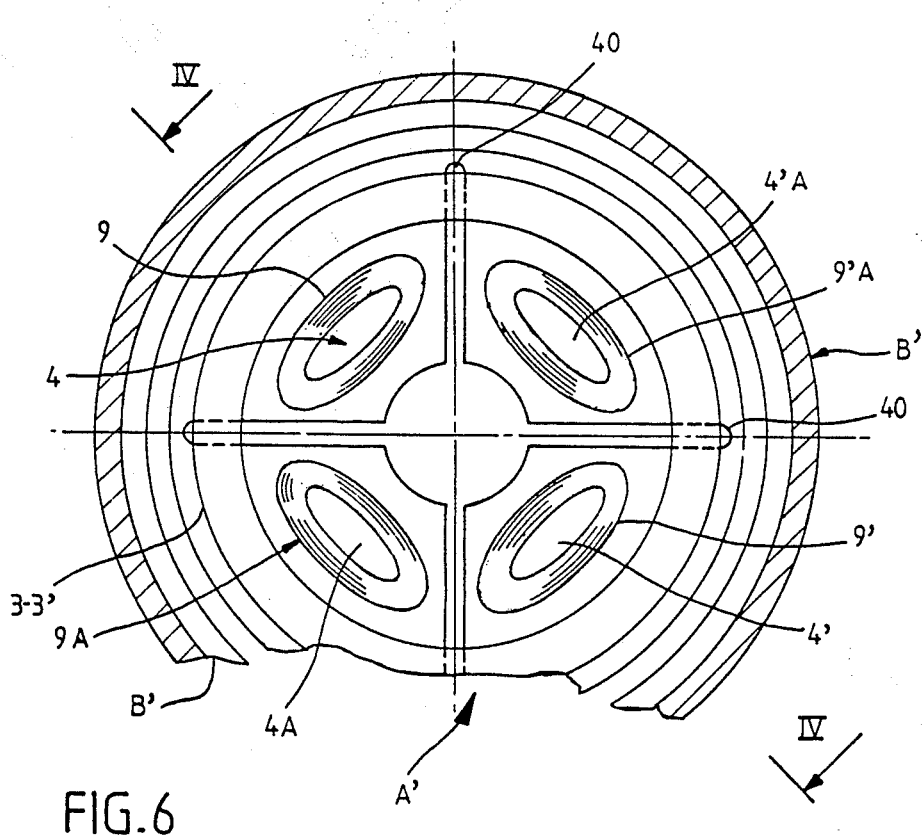
FIG.6

MAGNETIC BEARING FOR ACTIVE CENTERING OF A BODY MOVABLE RELATIVE TO A STATIC BODY WITH RESPECT TO AT LEAST ONE AXIS

BACKGROUND OF THE INVENTION

1. Field of the Invention

The present invention concerns a magnetic bearing for active magnetic centering of a body movable relative to a static body with respect to at least one centering axis perpendicular to a reference axis.

2. Description of the Prior Art

There have already been proposed magnetic bearings and magnetic suspension devices adapted to be integrated into systems comprising parts in relative movement between which there is to be no contact.

The relative movement is usually a rotation, but can also be movement in translation. Generally speaking, the known bearings comprise identical centering means with respect to two axes perpendicular to an axis of rotation.

The magnetic suspension devices are particularly recommended for rotating systems requiring:
a high speed of rotation,
a high level of reliability,
a high degree of precision in terms of positioning in the plane perpendicular to the rotation axis,
a highly stable speed of rotation, and
low energy consumption.

It has been known for some considerable time (EARNSHAW, 1842) that it is impossible to obtain a stable magnetic suspension using only static fields: it is therefore necessary to associate with static magnetic fields (permanent magnets) a minimum of energy (electrical, electrostatic or otherwise) to enable a body to be suspended.

In 1974 the assignees of the inventors developed a magnetic suspension device in which a floating rotating body is having degree of freedom controlled by a servomechanism whereas its other degrees of freedom are stabilized by permanent magnets (French patents 74 00190 and 74 40556, equivalent to U.S. Pat. No. 3,955,858 to Poubeau).

These systems were decoupled systems. Subsequent work has led to the production of integrated and therefore simplified systems resulting in increased reliability.

Thus there are known several magnetic suspension devices having two degrees of freedom controlled actively and three degrees of freedom controlled passively. They relate to the suspension of rotors for which there is usually a requirement for a high mass and therefore a high inertia.

U.S. Pat. No. 4,285,553 (ROBINSON) proposes a system in which the rotor carries a ring of magnets and the stator comprises flat internal pole rings linked by a cylindrical ferromagnetic wall. Electrical coils are placed on this latter cylindrical wall to avoid discontinuity of the polepieces and to minimize Eddy currents. The lines of magnetic force created by a pair of diametrally opposed coils energized simultaneously circulate in the pole rings of the rotor over one-half the perimeter and are closed via the cylindrical wall of the stator in two diametrally opposed areas facing the coils. These field lines therefore cross the airgap between the polepieces four times, leading to high losses. Certain of the lines of magnetic force are closed after covering only one quarter of the perimeter, passing through the airgaps of another pair of coils designed to control a second centering axis, which leads to interaction between the control axes that is difficult to control in order to achieve stability of the system.

U.S. Pat. No. 4,077,678 (STUDER) describes a flywheel energy storage device in which the magnetic type suspension groups together on the stator passive axial centering means and active radial centering means. Permanent magnets substituted for the cores of the coils result in a significant reduction in the efficiency of the servomechanisms. To increase the axial and radial stiffness due to the magnets by increasing their volume it is necessary to increase the volume of the coils, the turns of which facing the magnet are nevertheless totally ineffective, since their core is a permanent magnet.

U.S. Pat. No. 4,043,614 (LYMAN) describes a device in which the stator comprises a thick disk magnetized perpendicular to the rotation axis and clamped axially between two pole disks the diameter of which is slightly greater than that of the disk so that they can receive at their periphery two pairs of diametrally opposed electrical coils. The rotor, disposed around the stator, comprises a ring magnetized axially in the opposite direction to the disk and clamped between two flat pole rings. The principal disadvantage of this device is related to the absence of a magnetic flux permeable path between the polepieces carrying the coils, which significantly limits their efficiency.

U.S. Pat. No. 4,294,493 ((SINDLINGER) describes a magnetic suspension device which has the same disadvantages as that described in U.S. Pat. No. 4,043,614. The windings are very large, resulting in a considerable stator mass as compared with the rotor.

French patent 2 524 090 filed by the assignees of the inventors overcomes the disadvantages of the previous patents. It proposes a device in which, encountering only the reluctance of two airgaps, the lines of magnetic force follow a very short path situated in a plane containing the axis of rotation. The short length of this path reduces losses. Also, no unwanted interaction between the pairs of sectors associated with different axes can occur. In this suspension, however, the magnetically suspended part (rotor) comprises a permanent magnet, which removes any possibility of very high rotation speeds as these would be prejudicial to the mechanical durability of the magnet ring. Moreover, applications in which the rotating body is situated in a low pressure or corrosive gas are difficult to implement. Note also that the pole circuit of the coils includes discontinuities the consequence of which is rotational losses due to the Eddy currents which are therefore generated.

U.S. Pat. No. 4,000,929 (STUDER) describes a magnetic bearing for suspending a ring; this bearing comprises a central magnet magnetized axially clamped between ferromagnetic plates extended on crossed diameters by flanges around which coils are wound and the extreme edges of which define with the ring a single airgap. The magnetic flux in one pair of flanges is closed via the other pair of flanges, which procures radial centering of the ring. A bearing of this kind, extremely difficult to implement, has the major disadvantage that its mode of operation is based on coupling between the two control axes.

An object of the invention is to alleviate the aforementioned disadvantages.

SUMMARY OF THE INVENTION

The present invention consists in a magnetic bearing for active magnetic centering with respect to at least one centering axis of a body movable relative to a static body, said bearing comprising, on each side of a plane of symmetry perpendicular to said at least one centering axis and containing a reference axis:

at least one permanent magnet magnetized parallel to said reference axis, at least one combination comprising a ferromagnetic core parallel to said reference axis and a respective coil wound on said ferromagnetic core, and ferromagnetic members adapted to provide a closed magnetic path for magnetic flux produced by said at least one magnet and said at least one coil via airgaps on said centering axis separating said movable body from said other body, the magnetic bearing further comprising:

a control circuit comprising a sensor responsive to relative movement between said movable body and said other body along said centering axis and adapted to feed to said at least one coil a current adapted to correct such relative movement, two ferromagnetic plates carried by said other body between said at least one magnet and said at least one core are clamped, and a ferromagnetic polepiece carried by said movable body adapted to provide a closed magnetic path via said airgaps for magnetic flux circulating in said ferromagnetic plates.

It will be understood that a magnetic bearing of this kind makes it possible effectively to eliminate all the disadvantages mentioned in connection with the cited prior art patents. Thus:

the stator assembly comprises both the permanent magnets serving to create the passive stiffness and the coils procuring electromagnetic control of the suspended part with respect to the centering axis;

in the case of two crossed centering axes, the magnetic and electromagnetic circuits of these suspension axes are totally decoupled magnetically, the effect of which is to facilitate considerably the processing of signals in the electronic control circuits;

the polepieces through which passes the variable flux generated by the coils, which are aligned with each other at the level of the airgaps, do not feature any discontinuity, resulting in minimal Eddy current losses; and from the mechanical point of view, the bearing of the present invention is highly integrated and extremely simple; in particular, it is extremely easy to miniaturize it.

It is to be understood that the roles of the two bodies as stated in the foregoing definition of the invention may be interchanged.

According to one preferred feature of the invention, a static spacer or an airgap is disposed between the ferromagnetic core of the coil and one of the ferromagnetic plates between which it is clamped, the purpose of which is to avoid the flux generated by the magnet passing wholly through the core of the coil. As an alternative to this, a static airgap is provided between one or both of the ferromagnetic plates and the core so as to offer, in the absence of the aforementioned spacer, a non-negligible resistance to the magnetic flux generated through the core by the magnet.

According to another preferred feature of the invention, the polepiece of the movable body comprises teeth parallel to the centering axis having the same thickness and the same spacing between them as the ferromagnetic plates clamping the magnet and the core of the coil, which enables passive magnetic centering of the movable body relative to the static body with respect to the reference axis. This results in centering of the movable body relative to the other body in a plane perpendicular to the reference axis, this centering being passive with respect to said references axis and active with respect to said centering axis.

Said magnet preferably comprises an odd number of component magnets stacked with their directions of magnetization alternating and separated by intermediate ferromagnetic plates; the polepiece of the movable body comprises intermediate projecting crenellations aligned with the edge of these intermediate ferromagnetic plates so as to define intermediate airgaps. This feature, combined with the previous feature, makes it possible to increase the radial and axial stiffness of the bearing without having to double up the latter.

The magnet is preferably disposed between the ferromagnetic core carrying the coil and the polepiece of the movable body.

In relation to a first type of application in which the reference axis of the bearing constitutes a rotation axis for the movable body, the magnet forms part of a ring centered on this axis whereas at least two other coils, wound on two other cores, are disposed on a third axis perpendicular to the reference axis to procure, through cooperation with said ring, active magnetic centering of the movable body with respect to this third axis. In a first configuration the mobile body comprises a shaft disposed inside the static body whereas, in another configuration, the movable body comprises a ring surrounding said static body.

With reference to a second type of application, in which the movable body is designed to move in translation perpendicular to the centering axis and to the reference axis, each magnet is extended parallel to this third axis and the coils and their cores form parts of linear series of coils and cores procuring, with the elongate magnets, centering of the movable body parallel to the centering axis at a plurality of locations along the third axis. This movable body preferably comprises a bar extending along this third axis inside said static body. This bar preferably comprises lateral teeth aligned with the edge of the ferromagnetic plates clamping the magnets and the cores of the coils. In this way the bearing procures passive magnetic centering with respect to the reference axis and active centering with respect to the centering axis.

The reference axis is preferably vertical.

The active magnetic centering obtained in a bearing in accordance with the invention may be controlled by any known means and the offset from which the energization current is applied to the coils, disposed in series or in parallel, may be determined by a position sensor or preferably a speed sensor (and possibly even an acceleration sensor).

The movable body is caused to move relative to said static body, whether this movement is a linear one or one of rotation, by any known type means, for example linear magnetic motors (stepper motors, for example) or magnetic rotational drive motors such as those described in the patents discussed hereinabove in particular.

The objects, characteristics and advantages of the invention will emerge from the following description given by way of preferred and non-limiting example with reference to the appended drawings.

BRIEF DESCRIPTION OF THE DRAWINGS

FIGS. 4 and 5 are schematic views showing variations on FIG. 1.

FIG. 6 is a view of the device from FIG. 4 in cross-section on the line IV—IV in FIG. 4.

DESCRIPTION OF THE PREFERRED EMBODIMENTS

Figure 1:
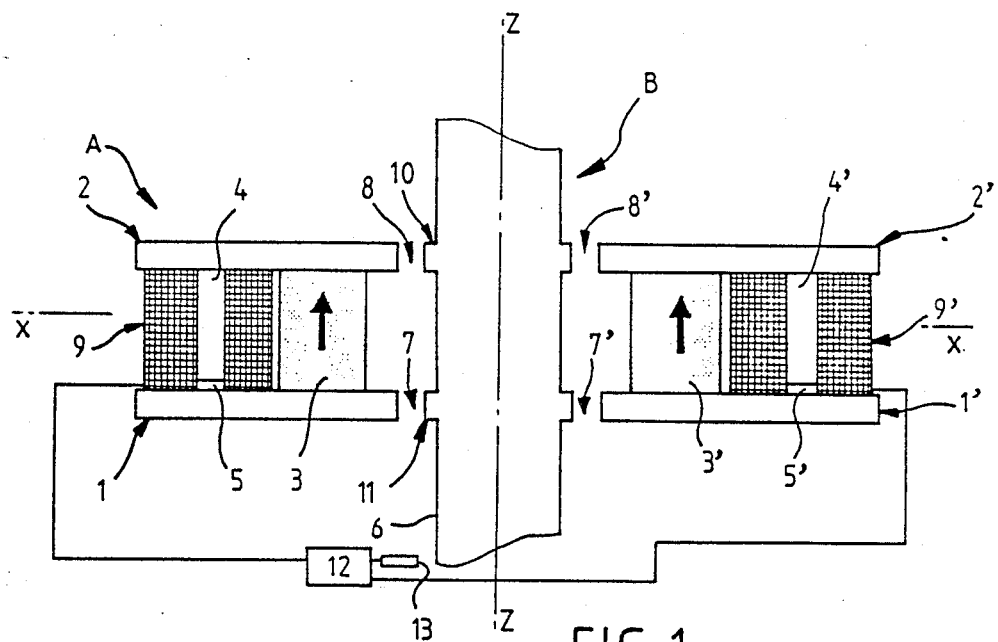
FIG. 1 is a schematic diagram in cross-section on a plane containing a reference axis Z—Z of a magnetic bearing in accordance with the invention, in a basic version with a single active magnetic centering axis.

FIG. 1 shows schematically a basic version of a bearing in accordance with the invention adapted to center a movable body B relative to a static body A with respect to a centering axis X—X perpendicular to a reference axis Z—Z.

For convenience in the remainder of this description it will be assumed that the body A constitutes a fixed rigid stator incorporating fixed sensing and drive means together with the electrical circuits required for correct operation of the bearing.

The body B comprises at least in line with the part A a pole piece 6 made from a ferromagnetic material (of any known type).

The basic bearing of FIG. 1 is an elementary one; it comprises two substantially symmetrical parts one on each side of a plane perpendicular to the axis X—X and containing the reference axis Z—Z. The same reference numbers are used for these two parts, a prime being used to distinguish those for the righthand part from those for the lefthand part in FIG. 1.

The lefthand part of the bearing in FIG. 1 comprises two ferromagnetic plates 1 and 2 (made from any known ferromagnetic material) parallel to the axis X—X between which is clamped a permanent magnet 3 magnetized parallel to the reference axis Z—Z. Also clamped between these plates is a coil wound on a ferromagnetic core 4 parallel to the axis Z—Z. A static spacer 5 is preferably provided between the core 4 and one of the ferromagnetic plates, in this instance the plate 1. Airgaps 7 and 8 are formed between the edges of the ferromagnetic plates 1 and 2 and the polepiece 6 of the movable body B. This polepiece 6 is advantageously provided with teeth 10 and 11 having the same thickness and the same spacing between them as the plates 1 and 2, aligned with the edges of the latter.

Figures 2, 3:
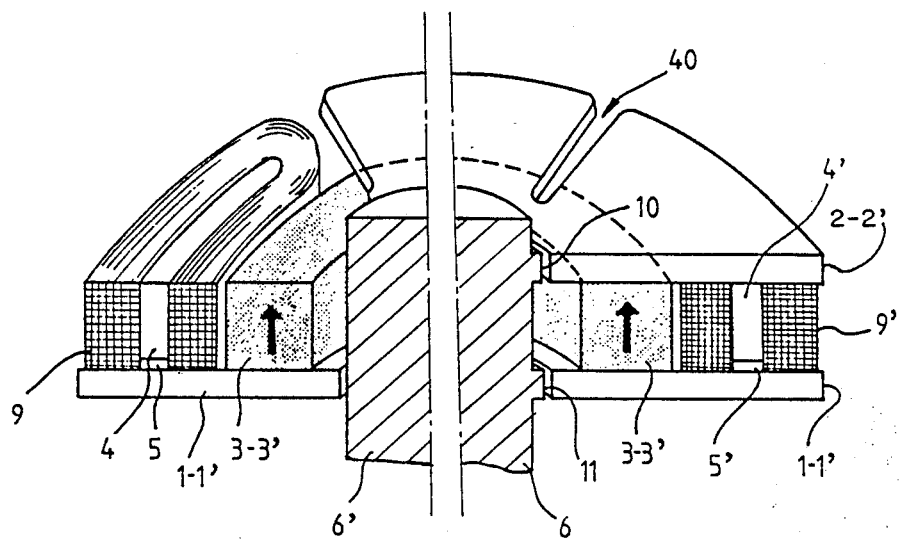
FIGS. 2 and 3 together show a partially cut-away half-view in perspective of another magnetic bearing in accordance with the invention with two crossed centering axes for magnetic suspension of a rotating body, FIG. 3 showing a variation of FIG. 2 in which the movable body does not comprise any teeth.

FIGS. 2 and 3 differ only in the respective presence or absence of such teeth 10, 11. They show a specific case in which the movable body B is a rotor adapted to rotate about the reference axis Z—Z.

An elementary bearing of the type shown in FIG. 1 is provided on each of two perpendicular centering axes both perpendicular to the reference axis Z—Z. These two bearings with one centering axis together constitute a more complex bearing with two centering axes. In this bearing the magnets 3 and 3' from FIG. 1 form part of a single annular magnet 3—3' magnetized axially and clamped between the two ferromagnetic disk-shaped plates 1—1' and 2—2' with a hole at the center. The cores 4 and 4', on the other hand, form part of an annular series of separate cores, there corresponding to each centering axis a pair of diametrically opposed cores 4, 4'; 4A, 4'A and a pair of coils 9A, 9'A; 9 and 9' (these reference numbers with the suffix "A" are shown only in FIG. 6).

The magnetic centering phenomena will now be described with reference to the lefthand part of FIG. 1, given that the phenomena operative in the righthand part of this figure and with respect to the second centering axis indicated in FIGS. 2 and 3 can be deduced immediately from this description.

The magnet 3 creates an axial magnetic field which separates in the ferromagnetic plate 2 into two magnetic fluxes which close on themselves, that on the right via the airgap 8, the ferromagnetic pole piece 6, the airgap 7 and the plate 1 up to the lower part of said magnet and that on the left via the coil core 4 and the static spacer 5. The benefit of this static spacer 5 is to prevent all of the magnetic flux generated by the magnet passing through the core 4 instead of the airgaps 7 and 8. This static spacer preferably has a magnetic resistance of the same order of magnitude as that of the aforementioned airgaps.

Referring again to FIG. 1 as a whole, it is seen that the magnetic fields in the airgaps 7 and 7', 8 and 8' create opposed forces. There therefore exists a position of unstable equilibrium in which the aforementioned airgaps are the same size. Any displacement of the body B parallel to the axis X—X generates a radial force on it determined by the difference between the sizes of the airgaps 7-8 and 7'-8' and referred to as "radial stiffness".

The coils 9—9', disposed in series or in parallel in any known way, are energized by an electrical current determined in a conventional way on the basis of the offset between the movable body B and its unstable equilibrium position or, and preferably, on the basis of its speed of displacement parallel to the axis X—X. This current makes it possible to create a magnetic field which opposes or adds to that created by the magnet 3, as appropriate to the case in question.

The current which flows in the coils, determined by a control circuit 12 and conditioned by a sensor 13 responsive to the position, speed or acceleration of the movable body B, serves to control the radial position of the part 6 relative to the position of the fixed parts of the bearing as a whole by means of a servo, so rendering the system stable.

This reasoning in respect of the complementary passive and active centering actions applies unchanged to the functioning and the control of the other active radial axes.

The benefit of this magnetic bearing with two active axes is that it enables magnetic suspension of a shaft or a cylinder for which movement in translation and tipping relative to the geometric axis must be controlled (see FIG. 2). The teeth 10 and 11, which are formed by parallel annular projections, for example, procure passive magnetic centering along the axis Z—Z. To increase the stiffness of this centering action the teeth 10 and 11 and the edges of the ferromagnetic plates have a cross-section featuring multiple crenellations, for example (see FIG. 7.

The system makes it possible to guide a cylinder through a magnetic wall when the former, without any teeth 10 and 11, is adapted to move in translation along the axis Z—Z (see FIG. 3).

If the teeth 10 and 11 are eliminated from the polepiece 6 of FIG. 2, as shown in FIG. 3 polepiece 6') there results a device whose axis perpendicular to the suspension plane is free. This axis may then be stabilized by any ancillary means the radial stiffnesses of which do not compromise the stability of the device in the suspension plane (a contactless linear motor, for example).

The number of control axes in the suspension plane can be increased as many times as required, as can the number of coils per axis.

FIGS. 4, 5 and 6 show a bearing with crossed centering axes having the same general structure as that from FIG. 2, except that the moveable body B' is in this instance a ring adapted to rotate about the static body A' or A", also having two perpendicular active magnetic centering axes.

As seen from FIGS. 1 and 4, the magnet 3 or 3' of each part of the bearing is preferably disposed between the core 4 or 4' of the coil 9 or 9' and the movable body B'. As an alternative to this, however, the coil may equally well be placed between the magnet and the movable body B', as shown in FIG. 5.

Figure 7:
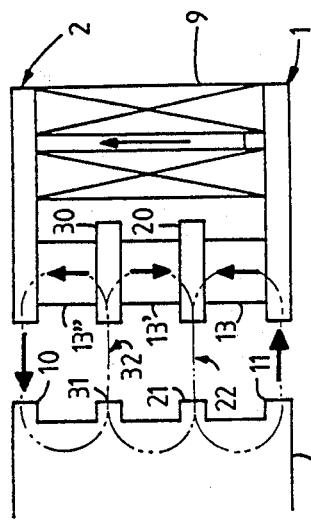
FIG. 7 is a half-view in cross-section showing another variation on FIG. 1.

FIG. 7 shows a variation on FIG. 1 in which the magnet 3 or 3' is replaced by a stack comprising an odd number of superposed component magnets 13—13'—13" the magnetization directions of which alternate and which are separated by intermediate ferromagnetic plates 20 and 30. The movable part B''' comprises, between the teeth 10 and 11, intermediate teeth 21 and 31 aligned with the edge of the intermediate plates 20 and 30 so as to define intermediate airgaps 22 and 32. This arrangement makes is possible to increase the radial stiffness of the bearing without having to increase the number of coils 9 and 9', etc.

In another variation (not shown) the number of coils per centering axis is increased, which makes it possible to increase the effectiveness of the active magnetic centering for a same size of bearing and to reduce the energization voltage of the coil control circuit and facilitates manufacture of the coils in the case of large-diameter bearings: it is easier to wind several coils onto substantially rectilinear cores disposed in a circle than to wind a single larger coil onto a "bean-shaped" curved elongate core.

FIGS. 1 through 7 show bearings having two perpendicular active magnetic centering axes. The number of crossed centering axes may be greater, of course. Also, the coils associated with the same centering axis may be controlled independently of each other. As an alternative to this, only one of them is energized at any given time.

Figure 8:
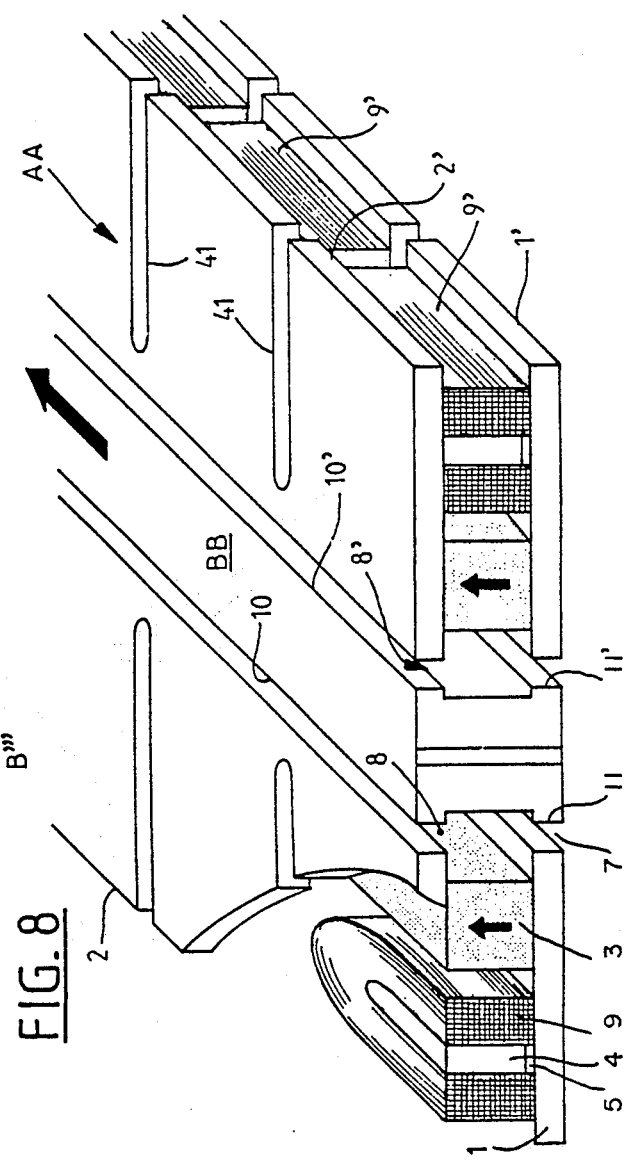
FIG. 8 is a partial view in perspective, partially cut away, of another magnetic bearing in accordance with the invention having at least two parallel centering axes, providing magnetic suspension of an elongate bar movable in translation perpendicularly to the reference axis and to the centering axis.

FIG. 8 shows another bearing in accordance with the invention adapted to center a bar BB adapted to move in translation along an axis perpendicular to the centering axis X—X and to the reference axis Y—Y Z—Z.

This bearing is formed by an alignment of at least two elementary bearings as shown in FIG. 1 disposed side by side, adapted to operate on the bar in successive areas along its length. This bearing is therefore formed, to each side of the central bar BB, by two elongate magnets 3 and 3' clamped between two elongate plates 1 and 2 or 1' and 2'. Parallel to these magnets and symmetrically about the axis Y—Y are disposed rows of combinations, each combination comprising a coil 3 wound on a ferromagnetic core 4 and disposed to procure a magnetic flux parallel to the reference axis Z—Z, each core being completed with a static spacer 5.

Figure 9:
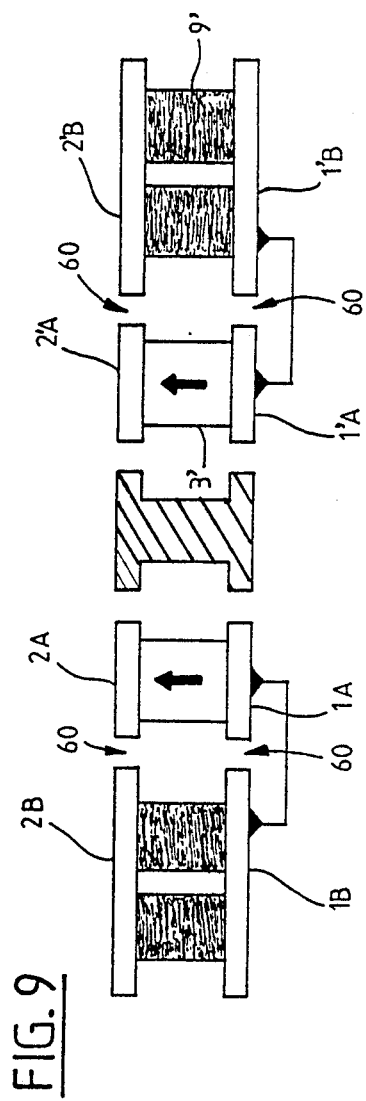
FIG. 9 is a schematic view in cross-section of a bearing that is a variation on FIG. 8.

FIG. 9 shows in a schematic way a variation on FIG. 8 in which the plates 1 and 2 or 1' and 2' between which the magnets and the coil cores are clamped are themselves divided into plates 1A-1B, 2A-2B which are mechanically coupled and which respectively clamp the cores and the magnets. They are separated by fixed airgaps 60 which are in series with the airgaps 7 and 8.

It will be noted from FIGS. 2 and 8 that slots 40 or 41 are formed in the ferromagnetic plates 1 and 2 or 1' and 2' except near the movable body in order to achieve magnetic separation of the fields generated by adjacent coils.

It will be understood that in the FIG. 8 embodiment, because of the teeth 10, 11, 10', 11' that the bar has near its longitudinal edges, there results active magnetic centering with respect to axis X—X parallel to the ferromagnetic plates and passive magnetic centering to the reference axis Z—Z.

The reference axis is preferably a vertical axis so that the force of gravity is compensated by the passive centering procured by the teeth 10' and 11'.

The invention lends itself to a very wide range of industrial applications, in particular:

high-performance magnetic recording heads rated at more than 250 Mbit/s (high rotation speed, recording head position control), cryogenic pumps (suspension of a compressor cylinder within an enclosure where the sealing clearance is obtained: possibility of a high number of cycles, absence of wear, no pollution within the enclosure), turbomolecular pumps (ability to function in corrosive atmospheres, high rotation speeds, no wear of bearings, absence of pollution), medical equipment.

It will be obvious that the foregoing description has been given by way of non-limiting example only and that the man skilled in the art can put forward numerous variations thereon without departing from the scope of the invention. The individual bearing from FIG. 1 lends itself to multiple combinations having coincident (FIGS. 2, 3, 5 and 8) or separate, for example perpendicular, reference axes. Also, the central bar from FIG. 8 can be divided into two separate but mechanically joined polepieces disposed between the components of the bearing or to either side thereof.

We claim:

1. Magnetic bearing for active magnetic centering of a body movable relative to a static body with respect to at least one centering axis, perpendicular to a reference axis, said bearing comprising on each side of a plane of symmetry perpendicular to said at least one centering axis and containing said reference axis:

at least one permanent magnet magnetized parallel to said reference axis;

at least one combination comprising a coil wound on a ferromagnetic core disposed to procure a magnetic flux parallel to said reference axis;

two ferromagnetic plates carried by said static body between which said at least one combination is clamped, said ferromagnetic plates adapted to provide a closed magnetic path for magnetic flux produced by said at least one combination via airgaps on said centering axis separating said movable body from said static body;

and further comprising:

a control circuit comprising a sensor responsive to relative movement between said movable body and said static body along said centering axis and adapted to feed to said at least one combination a current adapted to correct such relative movement;

a ferromagnetic pole piece in said movable body adapted to provide a closed magnetic path via said airgaps for magnetic flux circulating in said ferromagnetic plates.

2. Magnetic bearing according to claim 1, further comprising in said at least one combination a static spacer forming a magnetic gap disposed between said ferromagnetic core and one of said ferromagnetic plates.

3. Magnetic bearing according to claim 1, wherein said ferromagnetic polepiece comprises teeth having the same thickness and the same spacing between them as said ferromagnetic plates to procure passive magnetic centering of said movable body relative to said static body with respect to said reference axis.

4. Magnetic bearing according to claim 3, wherein said magnet comprises an odd number of component magnets stacked with their directions of magnetization alternating and intermediate ferromagnetic plates separating said component magnets and said ferromagnetic polepiece comprises intermediate teeth aligned with an edges on said intermediate ferromagnetic plates to define intermediate airgaps.

5. Magnetic bearing according to claim 1, wherein said magnet is disposed between said combination and said polepiece, parallel to said centering axis.

6. Magnetic bearing according to claim 1, wherein said ferromagnetic plates are in two parts mechanically coupled together with airgaps between them, corresponding first parts clamping said at least one combination and corresponding second parts clamping said magnet.

7. Magnetic bearing according to claim 1, wherein said reference axis is a rotation axis of said movable body and said at least one magnet is part of a magnetized ring centered on said rotation axis, and further comprising at least two other combinations each comprising a coil wound on a respective core disposed along a third axis perpendicular to said reference axis to procure active magnetic centering of said movable body with respect to said third axis.

8. Magnetic bearing according to claim 7, wherein said movable body comprises a shaft disposed inside said static body.

9. Magnetic bearing according to claim 7, wherein said movable body comprises a ring surrounding said static body.

10. Magnetic bearing according to claim 1, wherein said movable body is movable in translation along a translation axis perpendicularly to said centering and reference axes, said magnet extends parallel to said translation axis and said combination is part of a linear set of combinations cooperating with said magnets for centering of said movable body parallel to said centering axis at a plurality of locations along said translation axis.

11. Magnetic bearing according to claim 10, wherein said movable body comprises a bar extending along said translation axis inside said body.

12. Magnetic bearing according to claim 11, wherein said movable body comprises teeth with the same thickness and the same spacing between them as said ferromagnetic plates clamping said at least one magnet and said at least one combination to procure passive magnetic centering of said movable body relative to said other body with respect to said reference axis.

* * * * *